United States Patent [19]
Huang

[11] Patent Number: 5,667,906
[45] Date of Patent: Sep. 16, 1997

[54] STORAGE BATTERY HOUSING ON A MOBILE PHONE

[76] Inventor: Tsung-Wei Huang, 4F., No.7, Sec 2, Jen-Ai Road, Taipei, Taiwan

[21] Appl. No.: 692,519

[22] Filed: Aug. 5, 1996

[51] Int. Cl.$^6$ ............................................. H01M 2/10
[52] U.S. Cl. ............................... 429/90; 429/96; 429/99; 429/100
[58] Field of Search ....................... 429/99, 100, 90, 429/96

[56]  References Cited

U.S. PATENT DOCUMENTS

| | | | |
|---|---|---|---|
| 2,081,656 | 5/1937 | Anthony | 429/99 X |
| 4,563,727 | 1/1986 | Curiel | 429/100 X |
| 4,723,656 | 2/1988 | Kiernan et al. | 429/99 X |

*Primary Examiner*—John S. Maples
*Attorney, Agent, or Firm*—Bacon & Thomas

[57] ABSTRACT

An improved storage battery on a mobile phone is comprised of a base housing, a cover housing, an electric circuit board, a set of lithium batteries and a viewing window, wherein after closing and assembling of the base and the cover housings, a receiving space is formed therein for receiving the electric circuit board and the lithium batteries. When the base housing is secured on the mobile phone, electric energy provided by the lithium batteries will afford operation of the mobile phone, and the lithium batteries can be charged. A user can see directly through the viewing window provided on either the base housing or the cover housing and made with an acrylic plate to inspect the lithium batteries to prevent them from being changed to common batteries.

3 Claims, 3 Drawing Sheets

STORAGE BATTERY HOUSING ON A MOBILE PHONE

BACKGROUND OF THE INVENTION

1. Field of the Invention

The present invention relates to improvement of the storage battery on a mobile phone, and especially to a storage battery which is provided on the housing thereof with a viewing window in order that a user can inspect whether lithium batteries are used, thereby eliminating use of common batteries in lieu of the lithium batteries by an immoral distributor so that poor influence on the life of use and electric capacitance can be avoided.

2. Description of Related Art

It is well known that, the storage battery of a mobile phone is quite expensive. This is mainly because of the use of lithium batteries rather than common nickel cadmium or nickel hydrogen batteries in the storage battery section of the mobile phone, and prices thereof hence are much higher.

The difference between using lithium batteries and using of the common nickel cadmium or nickel hydrogen batteries for the storage battery resides in high electric capacitance of the lithium batteries, and the available hours of use of lithium batteries when they are charged in saturation which are at least triple in amount more than that of common batteries. While lithium batteries have non-memory effects, they need no discharging before charging, i.e., they are ready for use and being charged at any time, so that they are more convenient for use than the common batteries, and they are especially suitable for use with higher mobility of a mobile phone.

The lithium batteries mentioned above are mounted in the housing of a mobile phone. At the beginning of using thereof, no advantage will be found, but when the power source in the mobile phone with common batteries is exhausted after several hours of testing, then it is found that the lithium batteries can still be used for quite a long time. In purchasing, a customer normally does not wait for several hours for testing the life of use of a battery, and in view of this, some immoral distributors may change the lithium batteries for some common batteries and get the benefit of the price difference therebetween or make illegal money thereby. The interests of customers thus are seriously exploited. Accordingly, it is necessary to improve the structure of the storage battery on a conventional mobile phone.

SUMMARY OF THE INVENTION

IN view of this, the inventor of the present invention provides a novel structure for the storage battery on a mobile phone based on his professional experience of years in manufacturing and selling storage batteries for mobile phones, and after continuous study and improvement, for eliminating disadvantages residing in the prior art thereby protecting interests of customers.

In particular, improvement of the storage battery on a mobile phone of the present invention is based mainly on the difference between the lithium batteries and the common batteries, and a viewing device is provided for inspection. For example, the size of a lithium battery is different from those of the common No. 1 to No. 4 batteries sold in the markets, and they can be seen to be longer with the eyes. Besides the voltage of a lithium battery is higher, i.e., 3.6 v, while that of the common batteries only is 1.2 v, so that substitution of lithium batteries to render a mobile phone to activate temporarily, three common batteries must be used and substituted for one lithium battery (i.e., three 1.2 v common batteries are used substituting for one lithium batter. Thus, the electrical capacitance thereof is much less than that of the lithium battery), and by amount alone, we can readily see which are better. The present invention provides a viewing window at a suitable location on the housing of the storage battery of a mobile phone, and by means of it, a user can directly inspect the lithium batteries to see if they have been changed with common batteries.

The primary object of the present invention therefore is to provide an improvement for the storage battery of a mobile phone by way of a viewing window provided at a suitable location on the housing of the storage battery of the mobile phone, so that a user can directly see if the lithium batteries have been changed for common batteries.

The second object of the present invention is to provide an improvement for the storage battery of a mobile phone, so that the lithium batteries therein can not be changed with common batteries by a seller, and the manufacturer of the mobile phone will be in no way subject to inquiries about the quality of the storage battery therein the quality of the products can be guaranteed, and the reputation of the manufacturer of the mobile phone can be protected.

The present invention will be apparent in its practical structure and characteristics after reading the detailed description of the preferred embodiments thereof in reference to the accompanying drawings.

DETAILED DESCRIPTION OF PREFERRED EMBODIMENTS

Figure 1:
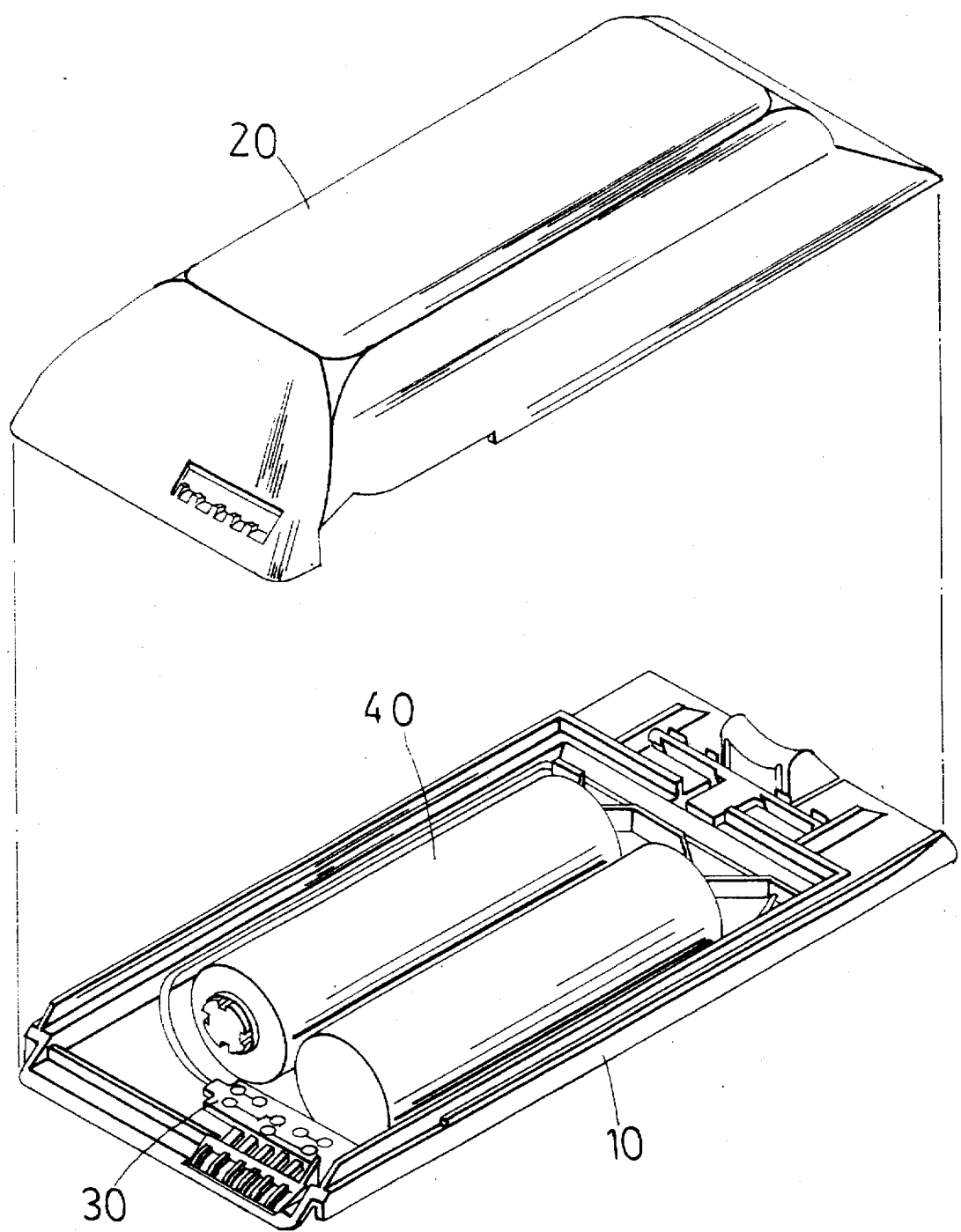
FIG. 1 is an exploded perspective view of the conventional storage battery on a mobile phone.

In FIG. 1, the structure of a typical storage battery for a mobile phone is provided and is comprised of a base housing 10, a cover housing 20, an electric circuit board 30 and a pair of lithium batteries 40. After closing and assembling of the base housing 10 and the cover housing 20, a receiving space is formed therein for receiving the electric circuit board 30 and the pair of lithium batteries 40. The storage battery with the base housing 10 as a leading side can be inserted into a mounting room provided therefor in the mobile phone to be electrically connected therewith. Electric energy from the lithium batteries 40 will be supplied through the electric circuit board 30 for operation of the mobile phone. When the lithium batteries 40 are to be charged, the storage battery can be taken off the mobile phone, and then is secured in a charging device. By taking advantage of the cover housing 20 and having the base housing 10 facing to the outside, the lithium batteries 40 will then be charged with electric power.

Figure 2:
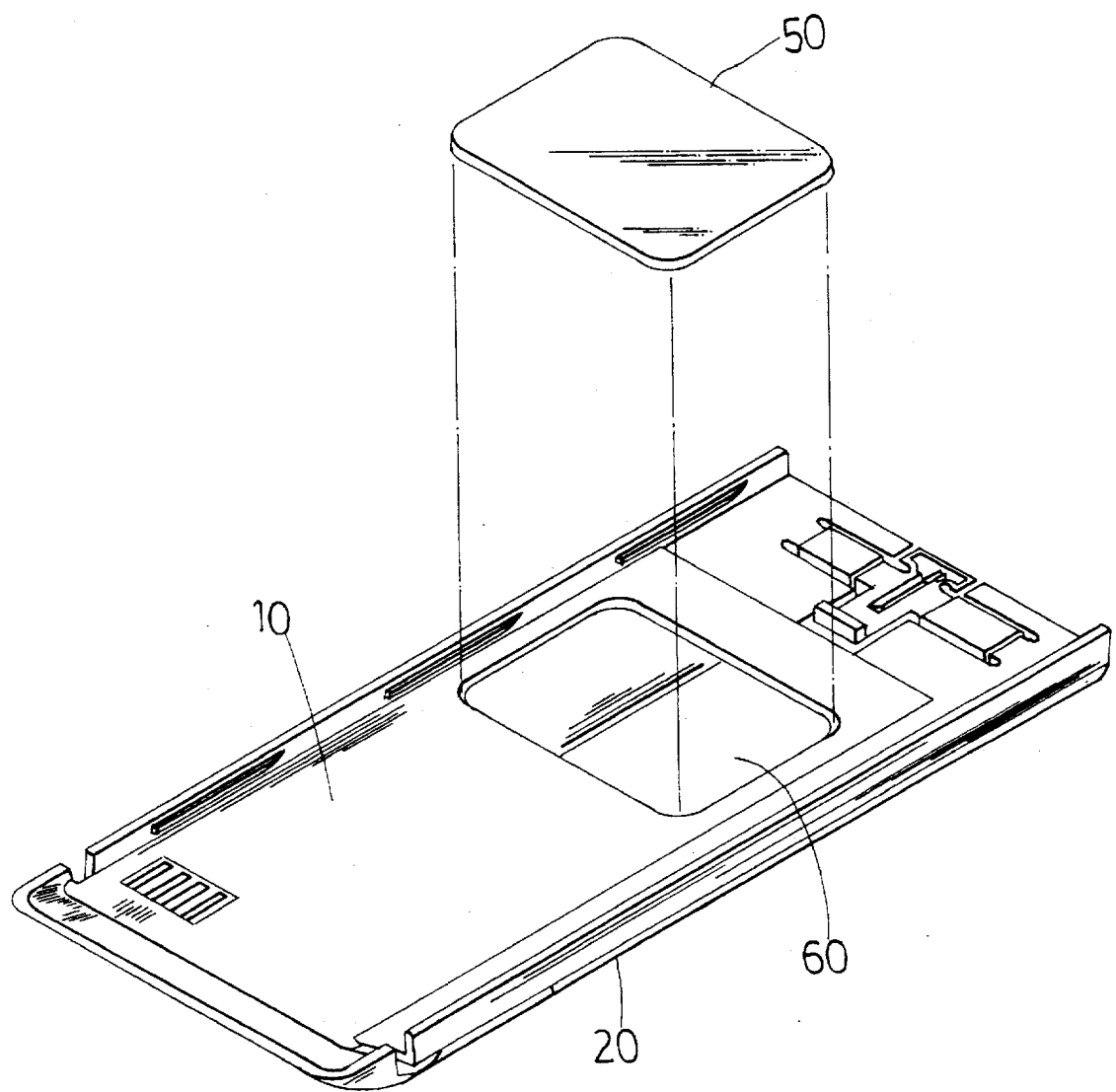
FIG. 2 is a partial exploded perspective view of the first embodiment of the present invention.
Figure 3:
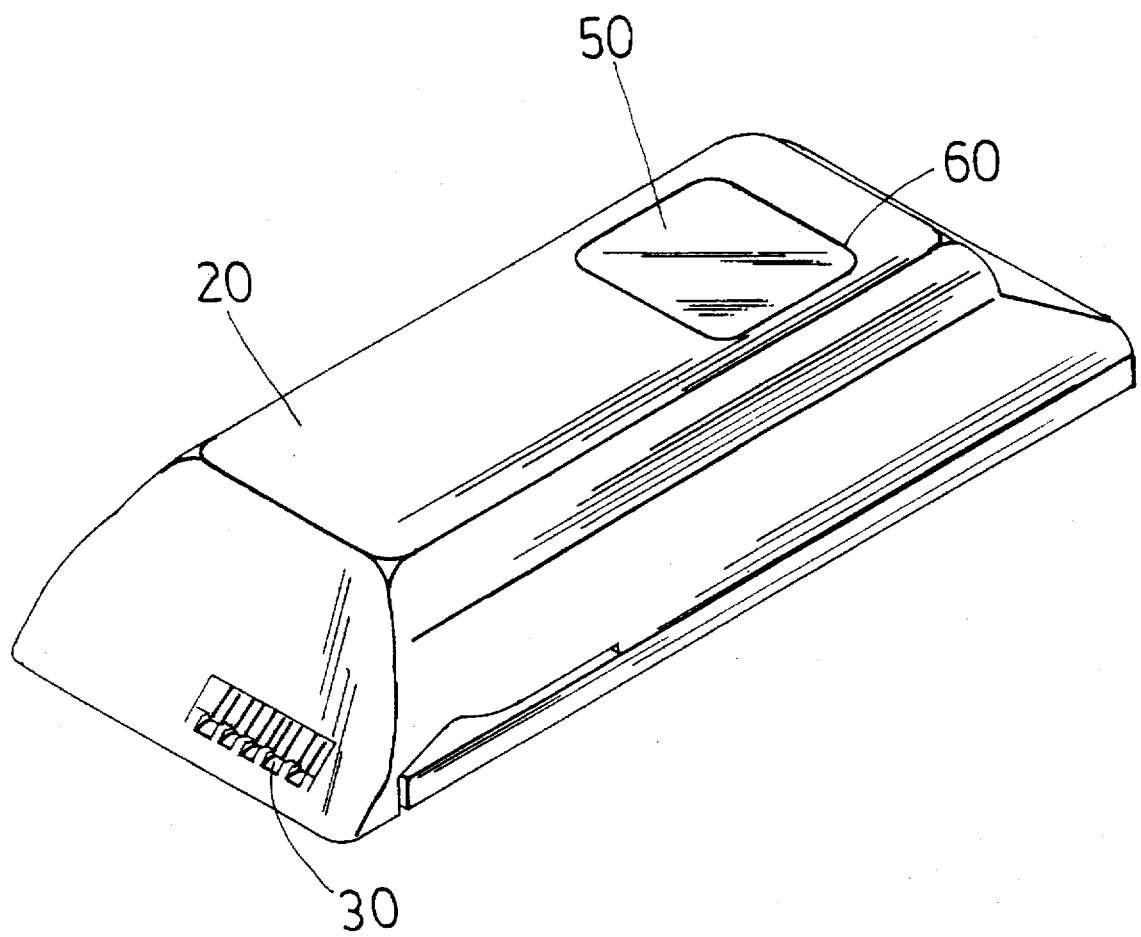
FIG. 3 is a perspective view of the second embodiment of the present invention.

Referring to FIGS. 2 and 3, improvement of the storage battery for a mobile phone in the present invention is the structure provided for the user to be able to inspect whether the lithium batteries 40 have been changed for common batteries. In view of the fact that no matter whether the storage battery is to be mounted in the mobile phone for use or is to be taken off for charging, either one of the electric circuit board 30 and the cover housing 20 will face to the outside, so that a viewing window 50 can be provided on the base housing 10 or the cover housing 20 for inspection. The viewing window 50 can be made with an acrylic plate embedded within an opening 60 provided in the base housing 10 (FIG. 2) or the cover housing 20 (FIG. 3). The opening 60 is importantly provided at a location where the lithium batteries 40 can be seen when the base housing 10 and the cover housing 20 are closed and assembled together. In this way, a user can see directly by inspection through the viewing window 50 the lithium batteries 40 in the storage battery, and no dismantling of the lithium batteries 40 is required for 15 inspection. The providing of the viewing window 50 can also prevent an immoral distributor from cheating and making illegal money at will by using common batteries in lieu of the lithium batteries, so that interests of customers can be guaranteed. Customers will in no way wonder about the quality of the storage battery therein and the quality of a mobile phone as well as question the reputation of the manufacturer of the mobile phone.

I claim:

1. An improved storage battery housing for a mobile phone, comprises:

a base housing secured in a storage battery mounting station provided in said mobile phone, a cover housing attached to said base housing to form a receiving space therebetween, an electric circuit board disposed in said receiving space formed by said base housing and said cover housing, at least one lithium battery also disposed in said receiving space formed by said base housing and said cover housing, wherein electric energy from said at least one lithium battery is supplied through said electric circuit board for operation of said mobile phone, and said at least one lithium battery is charged through said electric circuit board; and a viewing window formed within an opening provided on one of said base housing and said cover housing to permit direct viewing of said at least one lithium battery through said viewing window to visually inspect the presence of said at least one lithium battery in said receiving space.

2. The improved storage battery housing of claim 1 wherein the opening and the viewing window are provided in the base housing.

3. The improved storage battery housing of claim 1 wherein the opening and the viewing window are provided is the cover housing.

* * * * *